US010434737B2

(12) United States Patent
Doppenberg

(10) Patent No.: US 10,434,737 B2
(45) Date of Patent: Oct. 8, 2019

(54) TIRE BUILDING DRUM

(71) Applicant: VMI HOLLAND B.V., RK Epe (NL)

(72) Inventor: Evert Doppenberg, RK Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/320,699

(22) PCT Filed: Jun. 3, 2015

(86) PCT No.: PCT/NL2015/050399
§ 371 (c)(1),
(2) Date: Dec. 20, 2016

(87) PCT Pub. No.: WO2015/194940
PCT Pub. Date: Dec. 23, 2015

(65) Prior Publication Data
US 2017/0144396 A1 May 25, 2017

(30) Foreign Application Priority Data
Jun. 20, 2014 (NL) ...................................... 2013045

(51) Int. Cl.
*B29D 30/26* (2006.01)
*B29D 30/24* (2006.01)

(52) U.S. Cl.
CPC ........... *B29D 30/26* (2013.01); *B29D 30/242* (2013.01); *B29D 30/24* (2013.01); *B29D 2030/2657* (2013.01); *B29K 2905/12* (2013.01)

(58) Field of Classification Search
CPC ...... B29D 30/24; B29D 30/26; B29D 30/242; B29D 2030/265; B29D 2030/2657
See application file for complete search history.

(56) References Cited

U.S. PATENT DOCUMENTS 3,932,256 A  1/1976 Touchette ..................... 156/417
4,923,554 A  5/1990 Ozawa .......................... 156/417
(Continued)

FOREIGN PATENT DOCUMENTS

CN   101579930   11/2009  ............. B29C 30/24
JP   S5147070    4/1976   ............. B29C 67/00
(Continued)

OTHER PUBLICATIONS

Machine translation of JP 2009-274392, patent document published Nov. 26, 2009.*
(Continued)

*Primary Examiner* — Geoffrey L Knable
(74) *Attorney, Agent, or Firm* — Hayes Soloway P.C.

(57) ABSTRACT

A tire building drum has a drum shaft and a circumferential surface for receiving a tire component, wherein the circumferential surface is defined by segments which are radially movable between a contracted position in which the circumferential surface has a first radius and an expanded position in which the circumferential surface has a second, greater radius. The tire building drum includes cover plates, wherein each segment is provided with a first section having a first support surface for supporting the tire component and a second section with a second support surface for supporting the cover plate. Each second section is movable relative to its respective first section from a recessed position in which the second support surface is recessed with respect to first radius and an extended position in which the second support surface is raised towards the second radius.

22 Claims, 11 Drawing Sheets

(56) References Cited

U.S. PATENT DOCUMENTS

| | | | | |
|---|---|---|---|---|
| 4,929,298 A | * | 5/1990 | Van Der Poel | B29D 30/24 |
| | | | | 156/414 |
| 5,203,947 A | | 4/1993 | Boeker | 156/417 |
| 6,013,147 A | | 1/2000 | Byerley | 156/110.1 |

FOREIGN PATENT DOCUMENTS

| | | | | |
|---|---|---|---|---|
| JP | S60196330 | 10/1985 | | B29C 33/76 |
| JP | H11165358 | 6/1999 | | B29D 30/24 |
| JP | 2009274392 | 11/2009 | | B29D 30/26 |
| SU | 175219 | 9/1965 | | B29D 30/20 |
| TW | 201002511 | 1/2010 | | B29D 30/20 |
| WO | WO2009131456 | 10/2009 | | B29D 30/24 |

OTHER PUBLICATIONS

Grant of Patent for Korean Patent Application Serial No. 10-2015-7034418, dated Jun. 30, 2017 with translation (2 pages).
Notification of Reason for Refusal for Korean Patent Application Serial No. 10-2015-7034418, dated Nov. 21, 2016 English translation (2 pages).
International Search Report and Written Opinion issued in application No. PCT/NL2015/050399, dated Oct. 5, 2015 (11 pgs).
International Preliminary Report on Patentability issued in application No. PCT/NL2015/050399, dated Dec. 20, 2016 (7 pgs).
Japanese Decision to Grant (w/translation) issued in application No. 2016-573799, dated Apr. 4, 2018 (5 pgs).
Taiwanese Search Report (w/machine translation) issued in application No. 104118585, dated Dec. 21, 2018 (5 pgs).
Russian Search Report (w/machine translation) issued in application No. 2017101683, dated Jun. 7, 2018 (5 pgs).
Chinese Search Report (translation only) issued in application No. 201580031647.3, dated Jul. 4, 2018 (2 pgs).

* cited by examiner

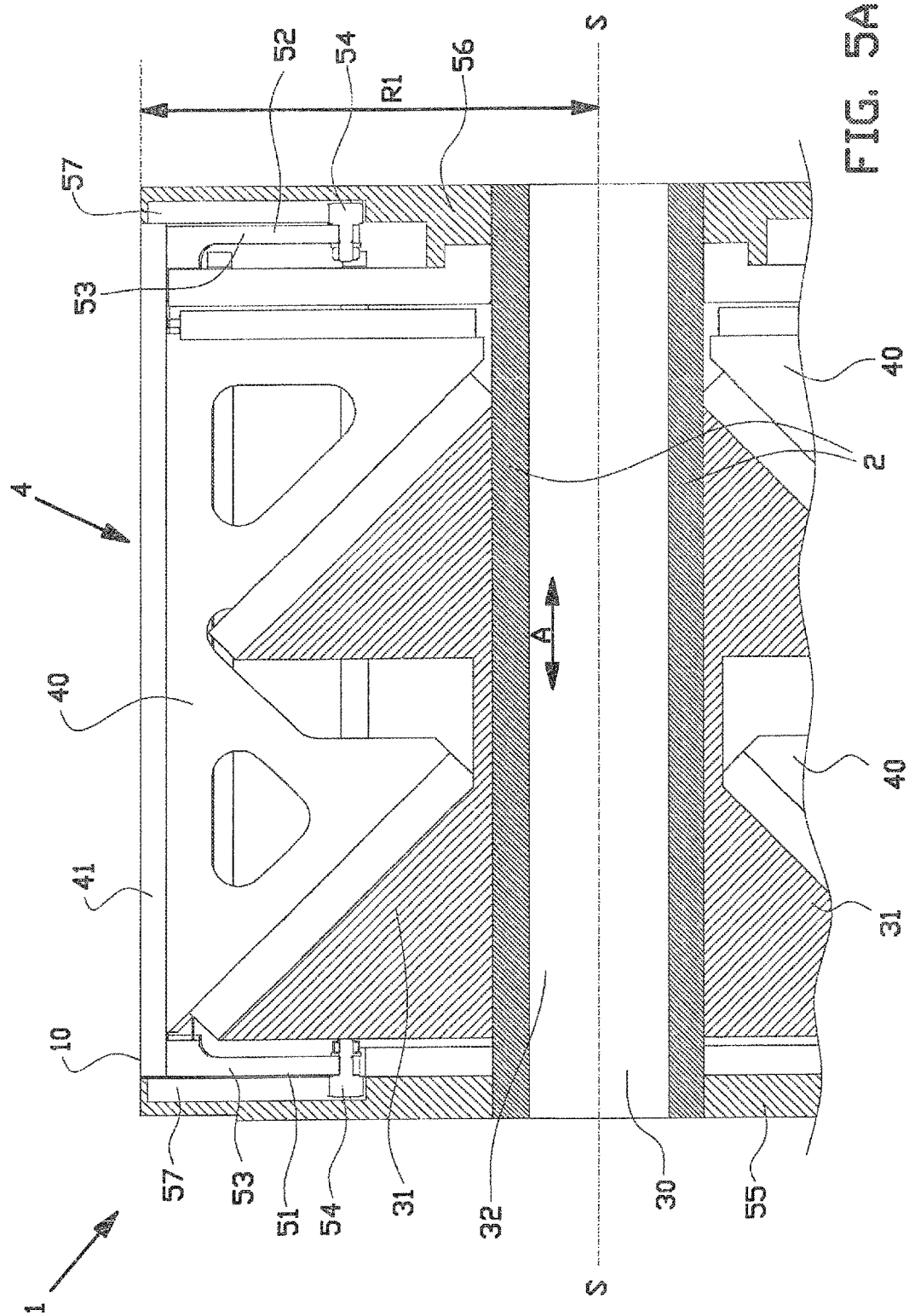

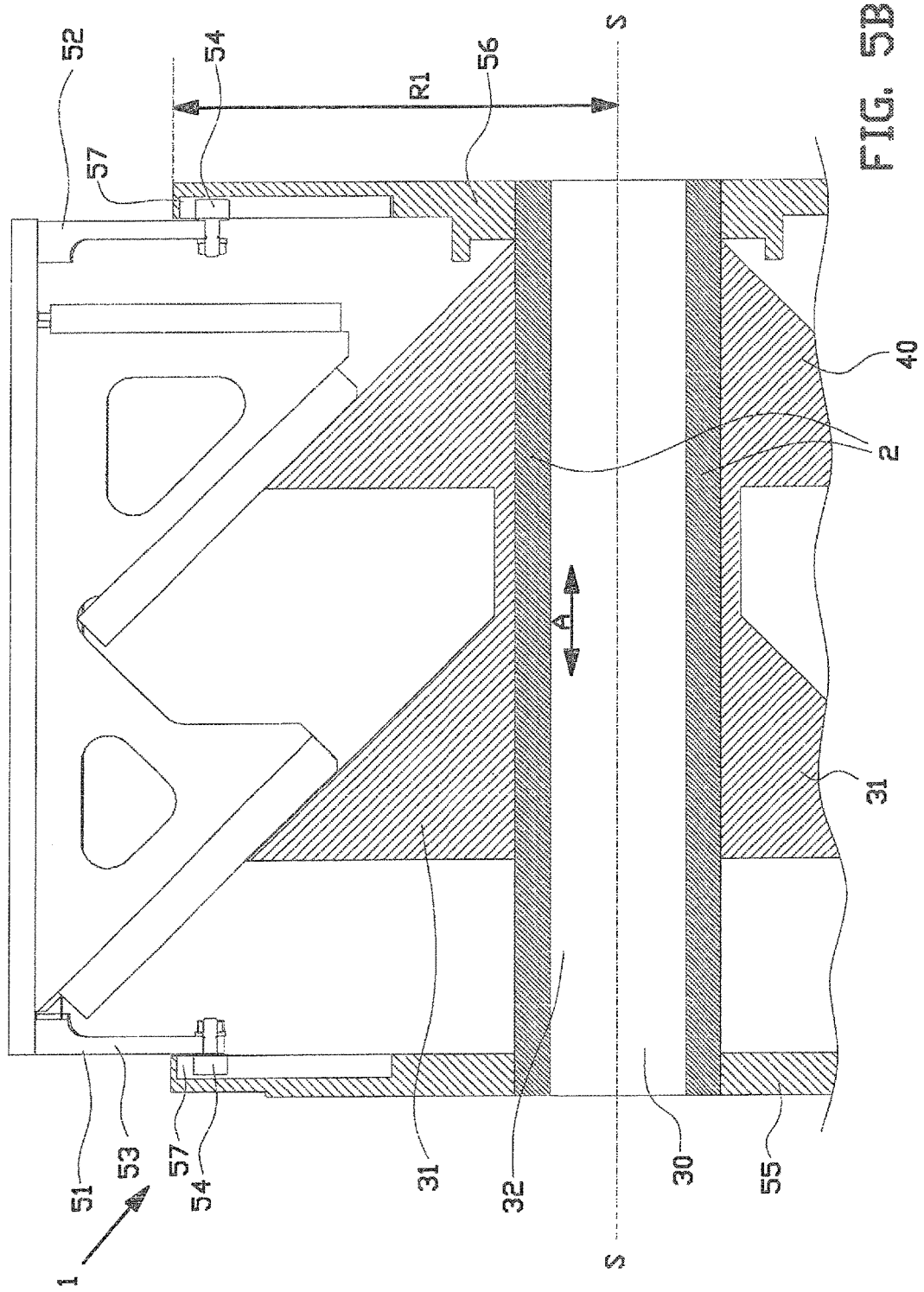

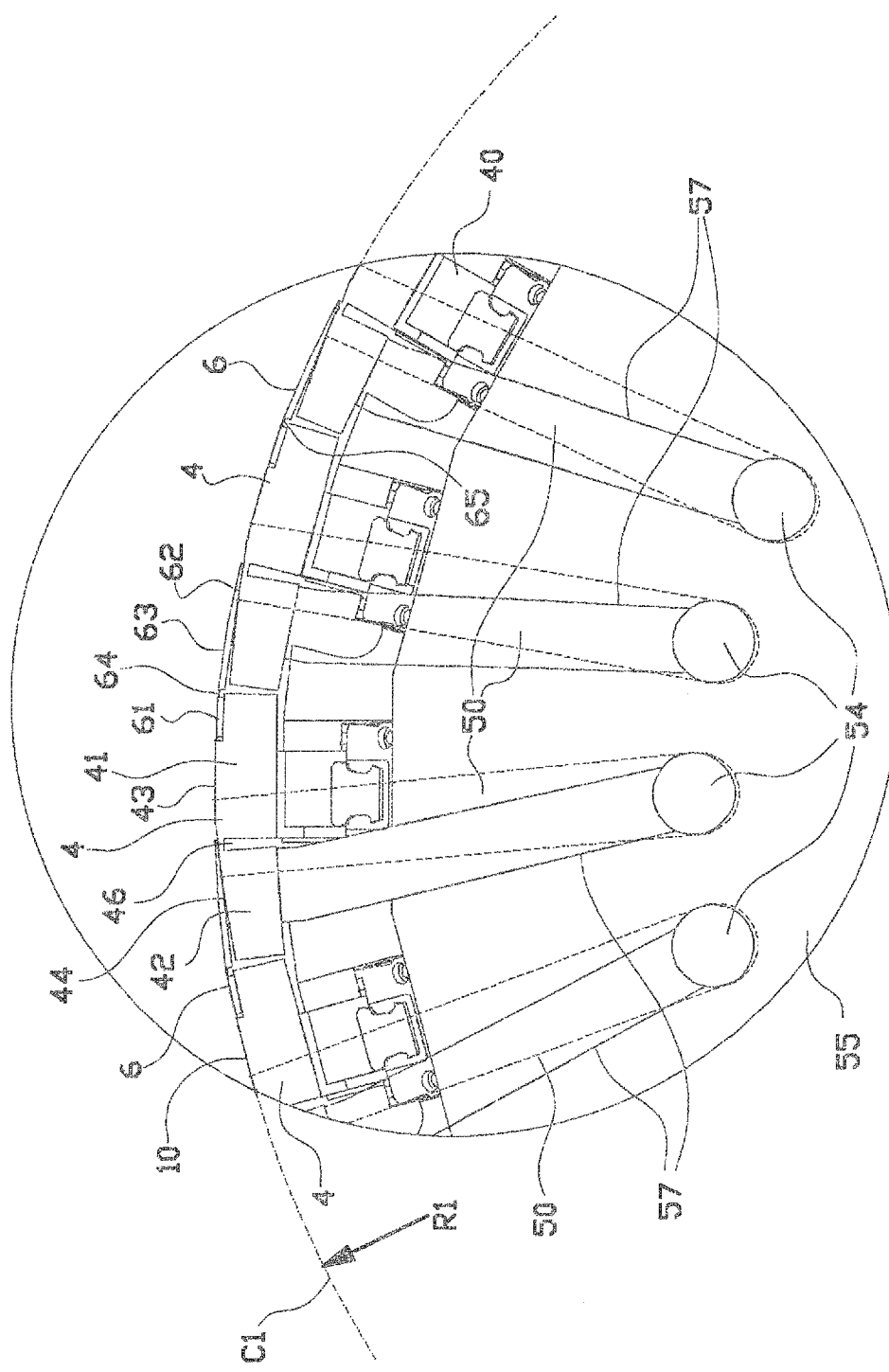

TIRE BUILDING DRUM

BACKGROUND

The invention relates to a tire building drum with a circumferential surface with a variable radius.

U.S. Pat. No. 3,932,256 A discloses a tire building drum having a large number of segments, which can move radially to expand and to contract the drum. The drum is further provided with cover plates for spanning the gaps between the segments in the expanded state of the drum. Each cover plate has a fixed longitudinal edge rigidly affixed to one of said segments and a free longitudinal edge overlying the other of said segments, the plate having an arched contour that, when free from an externally applied load, is support by one of the pair of segments only. The other of the pair of segments has cover plate support surface that is declined inwardly to underlie and to support said free edge when a load is applied to said cover plate.

JP 2009-274392 A discloses a similar expandable tire building drum, also having a plurality of segments and cover plates for spanning the gaps between the segments. Each cover plate is coupled to one of the segments via a spring loaded hinge, that is arranged to bias the cover plates onto a recessed cover plate support surface of an adjacent one of the segments. The cover plates are given a warp such that the free ends are always in contact with the cover plate support surface.

It is noted that in both the aforementioned prior arts, the cover plates and the segments are optimally adjusted for the radius of the circumference of the drum in the contracted state. However, in the expanded state, the circumference of the drum has a larger radius. As a result, the circumference of the drum will show a plurality of dips at the location where the cover plates rest on the adjacent segments. In addition, when the drum is expanded, the segments move apart and each cover plate moves in the circumferential direction of the drum with the segment to which it is fixed, thereby at least partly exposing the underlying cover plate support surface of the adjacent segment. As the exposed cover plate support surface is declined or recessed inwardly with respect to the base surface of the segment to accommodate the cover plate in the contracted state, a dip or waving pattern in the circumferential surface is created at the location of the cover plate support surface in the expanded state. These dips or waving patterns seriously affect the consistency of the tire component supported thereon, which ultimately affects the overall quality of the tire.

U.S. Pat. No. 6,013,147 A discloses an expandable belt and tread drum with an annular shell comprising a plurality of circumferentially spaced segments. Each segment is provided with an intermediate section and two adjacent side sections. The side sections are provided with fingers and mating slots that mesh with the side sections of adjacent segments. The side sections do not cover, overlap or support each other in the radial direction of the drum and therefore do not form a closed circumferential surface. The gaps between the side sections can seriously deform or even damage the tire components during expansion of the drum.

The side sections of U.S. Pat. No. 6,013,147 A are pivotally attached to the intermediate section for hinged movement relative thereto. Each segment further comprises guide plates which are rigidly mounted to the intermediate section and which extend in opposite directions to the side sections of adjacent segments. The guide plates are provided with elongated slots which are engaged by respective pins of the side sections of the adjacent segments. The shape of the elongated slots defines the pivoting behavior of the side sections of adjacent segments. When the segments move apart in the circumferential direction during the expansion of the drum, the elongated slots guide the side sections of the respective adjacent segments. The pivoting is thus a direct result of the relative spacing between the segments in the circumferential direction. Although U.S. Pat. No. 6,013,147 A provides a solution for pivoting meshing side sections of adjacent segments, it does not provide a solution for optimizing the consistency of a circumferential surface formed by segments and cover plates which are radially supported on the segments.

It is an object of the present invention to provide a tire building drum with a circumferential surface with a variable radius, wherein the consistency of the circumferential surface can be improved.

SUMMARY OF THE INVENTION

According to a first aspect, the invention provides a tire building drum comprising a drum shaft and a circumferential surface concentric to the drum shaft for receiving a tire component, wherein the circumferential surface is defined by segments which are movable in a radial direction with respect to the drum shaft between a contracted position in which the circumferential surface has a first radius and an expanded position in which the segments are spaced apart and in which the circumferential surface has a second, greater radius, wherein the tire building drum comprises cover plates for spanning the spaced apart segments, wherein each segment is provided with a first section having a first support surface for supporting the tire component in the radial direction and a second section with a second support surface for supporting the cover plate of an adjacent one of the segments in the radial direction, wherein, with the movement of the segments from the contracted position to the expanded position, each second section is movable relative to the first section of the same segment from a recessed position to an extended position, respectively, wherein, in the recessed position, the second support surface is recessed with respect to first radius towards the drum shaft and wherein, in the extended position, the second support surface is raised from the recessed position towards the second radius.

The second support surface, in the extended position, can contribute to a more round and/or more consistent circumferential surface of the tire building drum. In particular, waving patterns or dips in the circumferential surface of the tire building drum at the location of the second support surfaces or the cover plates supported thereon, can be reduced or even eliminated.

In an embodiment each segment is provided with a coupling section between the first section and the second section, wherein the coupling section defines a segment axis extending parallel to the drum shaft, wherein the second section is arranged to be rotated or bent relative to the first section between the recessed position and the extended position about the segment axis. The movement of the second section relative to the first section can thus take place about the segment axis parallel to the circumferential surface of the drum, thereby ensuring that the second support surface can be consistently moved relative to the first support surface over the entire width of the circumferential surface in the axial direction of the drum shaft.

In an embodiment the coupling section comprises a hinge, a film hinge or an integral hinge. The film hinge or integral hinge can provide a smooth transition from the first section to the second section via the coupling section, which can improve the consistency of the circumferential surface of the tire building drum at the coupling section.

In a preferred embodiment thereof the first section, the second section and the coupling section are integrally formed, preferably out of a flexible synthetic material. The sections can thus be manufactured as a simple yet functional single piece of material.

In an embodiment each segment is provided with a slit cooperating with the coupling section to facilitate the bending or rotation of the second section relative to the first section. The slit can locally weaken the segment to allow flexing of the material at the coupling section. The slit can furthermore provide the necessary clearance to allow the relative movement of the second section with respect to the first section.

In an embodiment the tire building drum further comprises a guide assembly or actuator assembly that is operationally coupled to each of the second sections for guiding or actuating the relative movement of the second sections with respect to their respective first sections. The guide assembly can provide a passive guidance of the second sections during an active radial movement of the segments, while the alternative actuator assembly can provide an actively driven relative movement of the second sections during the radial movement of the segments.

In an embodiment the guide assembly or actuator assembly is operationally placed between each second section and its respective first section. The operational coupling can be either a direct coupling or an indirect coupling, e.g. through a mechanism.

In an embodiment the tire building drum comprises a drive system coupled to each of the first sections for driving the radial movement of the segments between the contracted position and the expanded position relative to the drum shaft, wherein the guide assembly comprises a plurality of arms, each of which is coupled to a respective one of the second sections and a guide plate for guiding the plurality of arms relative to the drum shaft, wherein the guide plate is provided with a plurality of slots extending under an offset with the radial direction, wherein the each of the arms is slidably received in a respective one of the slots for movement along a non-radial path, wherein the difference between the radial movement imposed by the drive system on the first segments and the non-radial movement imposed by the guide plate on the plurality of arms is arranged to cause the movement of the second sections relative to their respective first sections. The combination of the arms and the slots can provide a simple yet effective way of guiding each individual second section with only passive components and/or a minimum of components.

In an embodiment each cover plate comprises a proximal end that is coupled to the first section of a respective one of the segments, an opposite distal end that is arranged to rest on the second support surface of an adjacent one of the segments and a third support surface extending between the proximal end and the distal end for supporting the tire component between the spaced apart segments, wherein the distal end of said cover plate is movable relative to its respective first section to follow the movement of the second support surface of the adjacent one of the segments when the second section of said adjacent one of the segments is moved from the recessed position to the extended position. The distal end of the cover plate can thus be brought into abutment with the second support surface in either the recessed or the extend position, thereby maintaining a substantially closed circumferential surface of the tire building drum. The second section can further impose a rotation on the distal end of the cover plate with respect to its proximal end, which rotation at least partly compensates for the opposite rotation or dip that would be imposed on the distal end by the change in the relative spaced apart positions of the two adjacent segments alone.

In an embodiment said cover plate comprises a coupling between the proximal end and the distal end, wherein the coupling element defines a cover plate axis extending parallel to the drum shaft, wherein the distal end is arranged to be rotated or bent relative to the proximal end between about the cover plate axis. The movement of the distal end relative to the proximal end can thus take place about the cover plate axis parallel to the circumferential surface of the drum, thereby ensuring that the distal end can be consistently moved relative to the proximal end over the entire width of the circumferential surface in the axial direction of the drum shaft.

In an embodiment the coupling element comprises a hinge, a film hinge or an integral hinge. The film hinge or integral hinge can provide a smooth transition from the proximal end to the distal end via the coupling element, which can improve the consistency of the circumferential surface of the tire building drum at the coupling element.

In an embodiment the proximal end, the distal end and the coupling element are integrally formed, preferably out of spring steel. The cover plate can thus be manufactured as a simple yet functional single piece of material.

In an embodiment each cover plate is provided with a slit cooperating with the coupling element to facilitate the bending or rotation of the distal end relative to the proximal end. The slit can locally weaken the cover plate to allow flexing of the material at the coupling element. The slit can furthermore provide the necessary clearance to allow the relative movement of the distal end with respect to the proximal end.

In an embodiment, in the recessed position, the second support surface is arranged to support the cover plate in a first support position with its third support surface extending substantially along or at the first radius and wherein, in the extended position, the second support surface is arranged to support the cover plate in a second support position with its third support surface extending substantially along or at the second radius. Thus, in both the recessed position and the extended position, the third support surface can be supported along the respective first and second radius, respectively. In particular, the radius of the third support surface can be adjusted depending on the recessed or extended position of the second section on which it is supported. At both radii, the third support surface can be made to approximate the circumference of the circumferential surface of the tire building drum as close as possible, to make said circumferential surface as round or consistent as possible.

In an embodiment the movement of the second section from the recessed position to the extended position, the second section is arranged for lifting the distal end of the cover plate supported thereon towards the second circumference. The lifting can at least partly compensate for the opposite rotation or dip that would be imposed on the distal end by the change in the relative spaced apart positions of the two adjacent segments.

In an embodiment the first support surfaces and the third support surface form a combined support surface with an average radius which in the contracted position of the segments is equal to or substantially equal to the first radius and in the expanded position of the segments is equal to or substantially equal to the second radius. The radius of the combined support surface can thus be adjusted accordingly with the change of the radii of the circumferential surface when the segments are radially moved. At both radii, the combined support surface can thus be made to approximate the circumference of the circumferential surface of the tire building drum as close as possible, to make said circumferential surface as round or consistent as possible.

In an embodiment the cover plates, in the contracted position of the segments, at least partially cover the second support surface on which they are supported, wherein an increasing part of said second support surface is exposed when the segments are moved towards the expanded position, wherein each second section, in the extended position, is moved towards the second radius such that the exposed part of the second support surface extends substantially along or at the second radius. The second support surface can thus form part of the circumferential surface of the tire building drum for supporting the tire components. By raising the second support surface towards the second radius, dips or waving patterns at the transition between the second support surface and the cover plate supported thereon and/or at the transition between the second support surface and the respective first support surface can be reduced or even eliminated, thereby increasing the consistency of the circumferential surface of the tire building drum.

In an embodiment the exposed part of the second support surface is arranged for directly supporting the tire component. The exposed part of the second support surface can thus actively contribute to the function of the circumferential surface of the tire building drum.

In an embodiment the first support surfaces, the second support surfaces and the third support surface, in the expanded position of the segments form a combined support surface with an average radius which is equal to or substantially equal to the second radius. The radius of the combined support surface can thus be adjusted accordingly with the change of the radii of the circumferential surface when the segments are radially moved. At both radii, the combined support surface can thus be made to approximate the circumference of the circumferential surface of the tire building drum as close as possible, to make said circumferential surface as round or consistent as possible.

According to a second aspect, the invention provides a method for varying the radius of the circumferential surface of the aforementioned tire building drum, wherein the method comprises the step of moving each second section relative to its respective first section, simultaneously with the movement of the segments from the contracted position to the expanded position, from the recessed position to the extended position.

Again, the second support surface, in the extended position, can contribute to a more round and/or more consistent circumferential surface of the tire building drum. In particular, waving patterns or dips in the circumferential surface of the tire building drum at the location of the second support surfaces or the cover plates supported thereon, can be reduced or even eliminated.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 5A and 5B show a cross section of the tire building drum according to the line V-V in FIG. 1, with the segments in the contracted position according to FIG. 1 and the expanded position according to FIG. 2, respectively;

FIG. 6A shows a detail of the tire building drum according to the circle VI A in FIG. 1;

DETAILED DESCRIPTION OF THE INVENTION

FIGS. 1, 2, 5A and 5B show partial views of a tire building drum 1 according to an exemplary embodiment of the invention. It will be clear that the tire building drum 1 continues outside the boundaries of the drawings and that the partial view is representative for the entire circumference of the tire building drum 1. The tire building drum 1 is arranged to be contracted and expanded in its radial direction. The tire building drum 1 is typically used to receive tire components, in particular breaker and tread packages, for tire building. The tire building drum 1 may however also be used for other tire components and packages for tire building.

Figure 1:
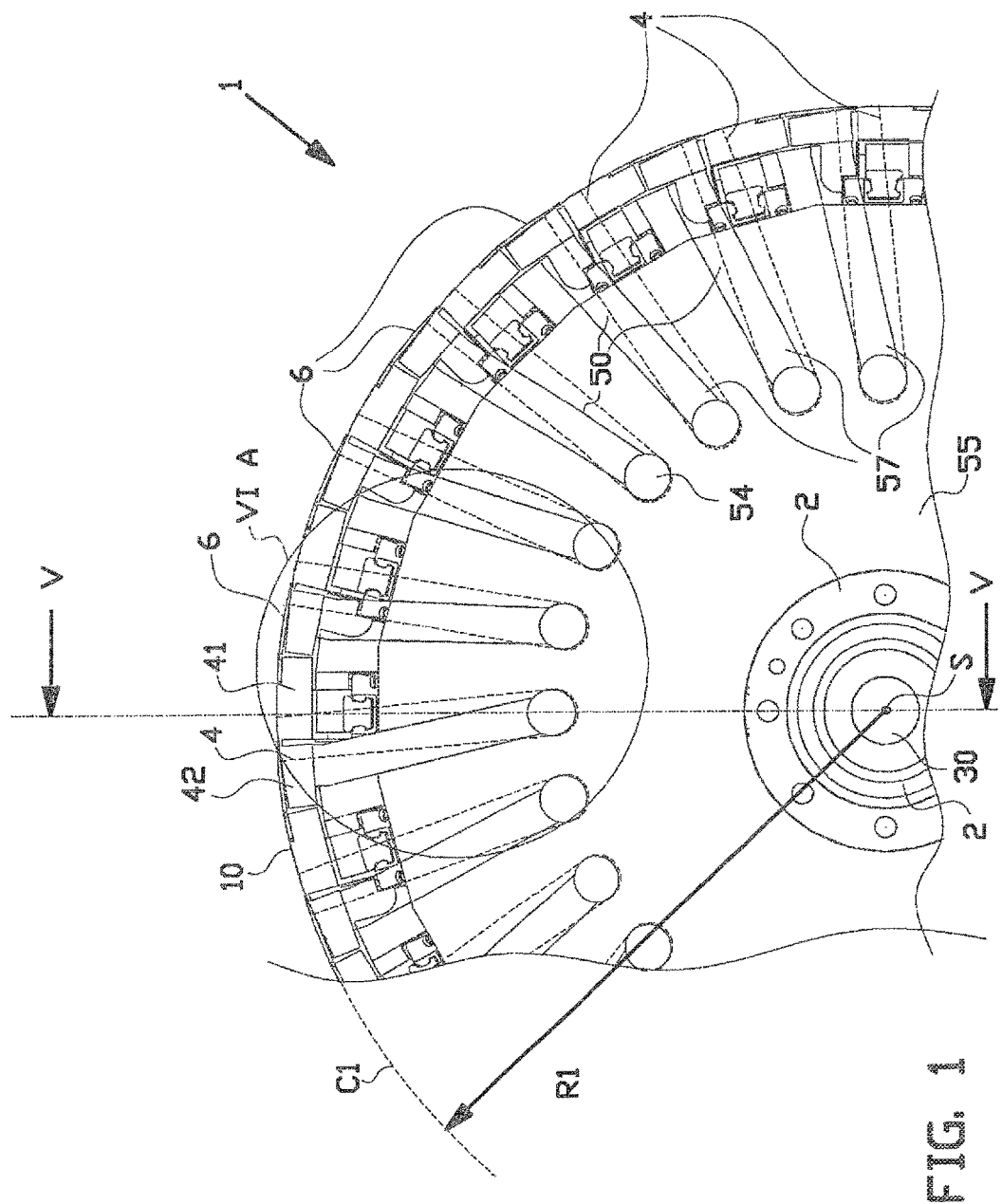
FIG. 1 shows a partial side view of the tire building drum with a plurality of segments according to the invention, wherein the segments are in a contracted position.
Figure 2:
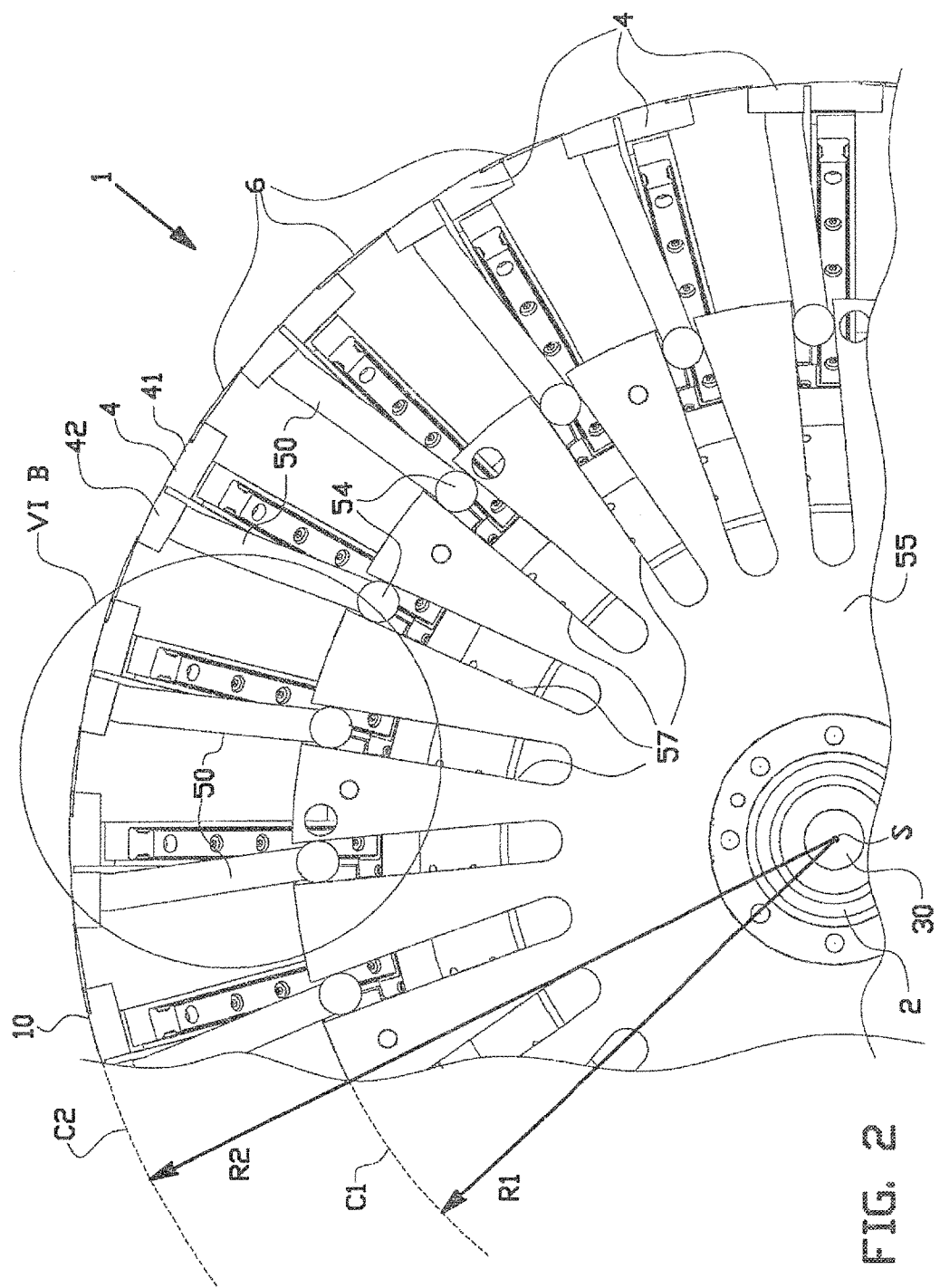
FIG. 2 shows a partial side view of the tire building drum according to FIG. 1, wherein the segments are in an expanded position.

As shown in FIGS. 5A and 5B, the tire building drum 1 comprises a drum shaft 2 that defines an axial direction A and a central rotation axis S about which the tire building drum 1 is arranged to be rotated by a rotary drive (not shown). The tire building drum 1 further comprises a drive system and a plurality of segments 4 operationally coupled to said drive system. The plurality of segments 4 are evenly distributed in the circumferential direction of the tire building drum 1 to define or form a circumferential surface 10 of the tire building drum 1, for receiving the tire components. The drive system is arranged for moving the plurality of segments 4 in the radial direction of the tire building drum 1 between a radially contracted position as shown in FIGS. 1 and 5A and a radially expanded position as shown in FIGS. 2 and 5B. In the radially contracted position of the plurality of segments 4 the circumferential surface 10 of the tire building drum 1 has a first circumference C1 with a first radius R1, while in the radially expanded position of the plurality of segments 4 the circumferential surface 10 of the tire building drum 1 has a second, greater circumference C2 with a second, greater radius R2.

In an exemplary embodiment, the drive system drives a plurality of first wedge members 31, e.g. centrally from within the drum shaft 2 (not shown). The first wedge members 31 are arranged on the drum shaft 2 to be slidable in the axial direction A of the drum shaft 2. The first wedge members 31 are provided with run-on or wedge surfaces which are inclined in one of the axial directions A of the tire building drum 1. FIGS. 5A and 5B only show a cross section of one of the first wedge members 31 interacting with one of the segments 4. It will be clear to one skilled in the art that the other of the first wedge members 31 are evenly distributed in the circumferential direction of the tire building drum 1, one underneath each of the plurality of segments 4, for interacting with each of those segments 4 and that all of these first wedge members 31 are driven simultaneously and equally by the drive system in the axial direction A of the tire building drum 1.

FIGS. 5A and 5B further shows one of the segments 4, which is representative for each segment 4 of the plurality of segments 4. Each segment 4 comprises a second wedge member 40 which is inclined in the same direction as the first wedge members 31 and which is arranged to be slidably arranged, in the direction of inclination, on the first wedge members 31. The segments 4 are axially fixed with respect to the drum shaft 2 in a manner which will be described later. Operation of the drive system is converted by the inclined sliding of the first wedge members 31 with respect to the second wedge member 40 into a radially outward or inward translation of the second wedge members 40 with respect to the drum shaft 2. The first wedge members 31 thus effectively force the second wedge members 40 radially outwards.

Figure 3:
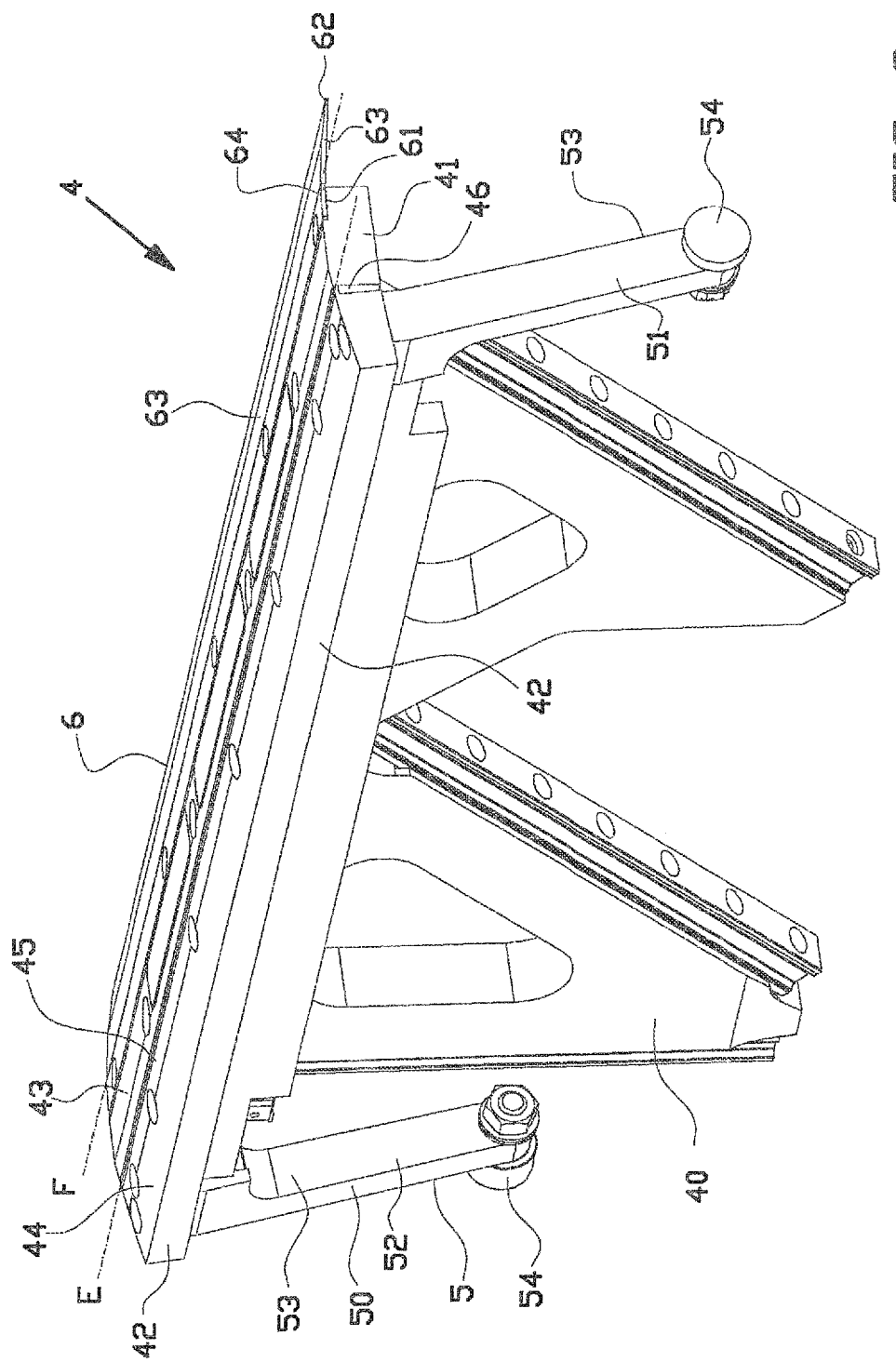
FIGS. 3 and 4 shows two views in perspective of one of the segments of the tire building drum according to FIGS. 1 and 2.
Figure 4:
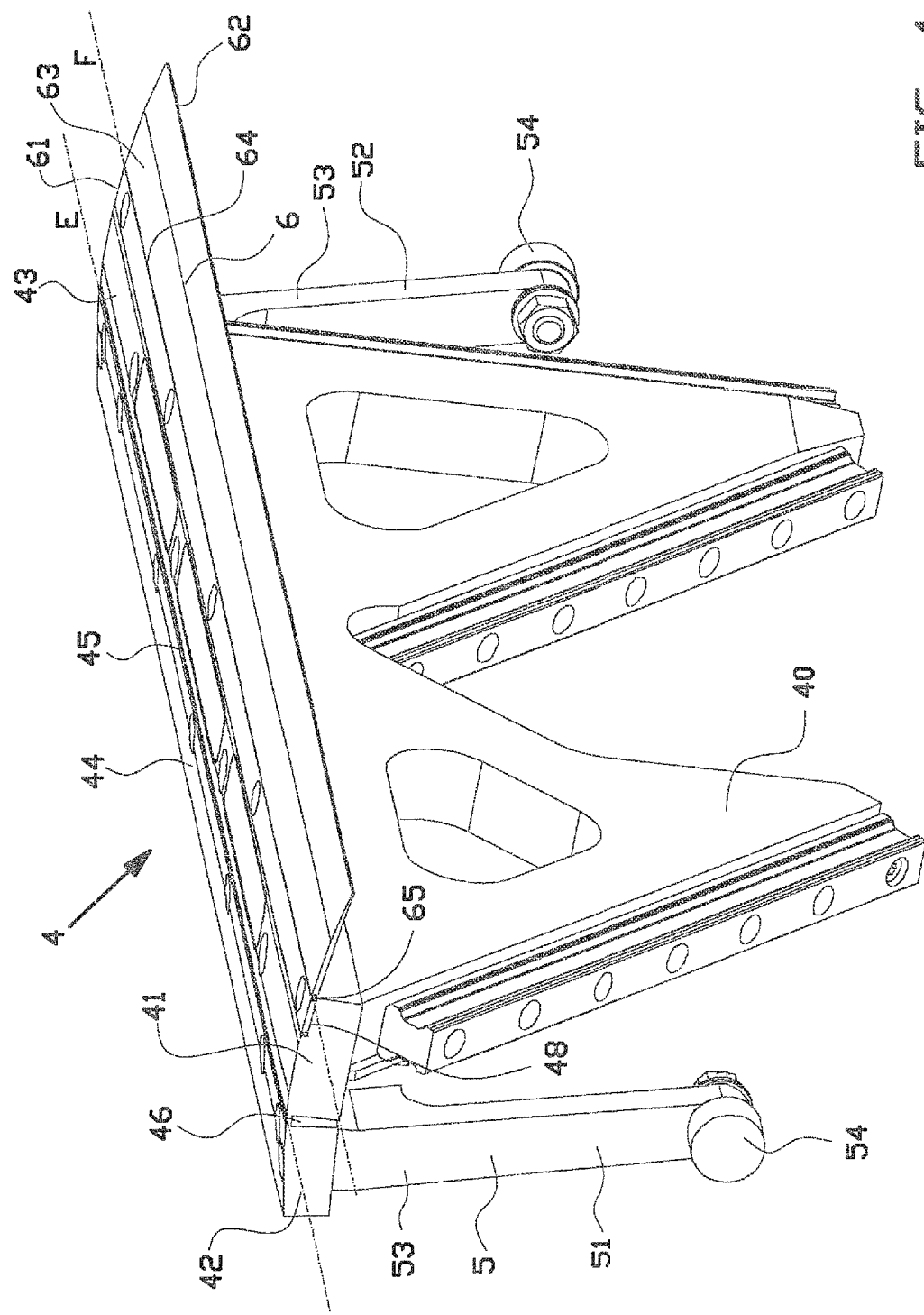

FIGS. 3 and 4 show the representative one segment 4 separately from the tire building drum 1. The segment 4 comprises a first section 41 which is fixedly supported on the second wedge member 40 at the radially outer side of the segment 4 and a second section 42 which extends at one side of the first section 41 in the circumferential direction of the tire building drum 1. The second section 42 is arranged to be movable in a first direction of rotation M with respect to its respective first section 41 from a recessed position to an extended position in a manner which will be described in more detail hereafter. The first section 41 is provided with a first support surface 43 that faces radially outwards and that forms and/or defines a part of the external circumferential surface 10 of the tire building drum 1. As such, the first support surface 43 is arranged to be in direct contact with and/or for directly supporting the tire components. The first support surface 43 is arranged to be at, to extend along, to match, to be concentric to or to approximate the first circumference C1 in the contracted position of the segment 4. Preferably, the first support surface 43 has been given a curvature that is substantially coincident with the first circumference C1. Alternatively, the first support surface 43 can be a relatively flat surface having a tangent that is substantially the same as the average tangent of the circumference C1 at the first support surface 43. The second section 42 is provided with a second support surface 44 that is arranged to extend at a variable angle or inclination with respect the first circumference C1 of the tire building drum 1 or with respect to a tangent or a plane of the first circumference C1 at the transition from the first section 41 to the second section 42.

Figure 7:
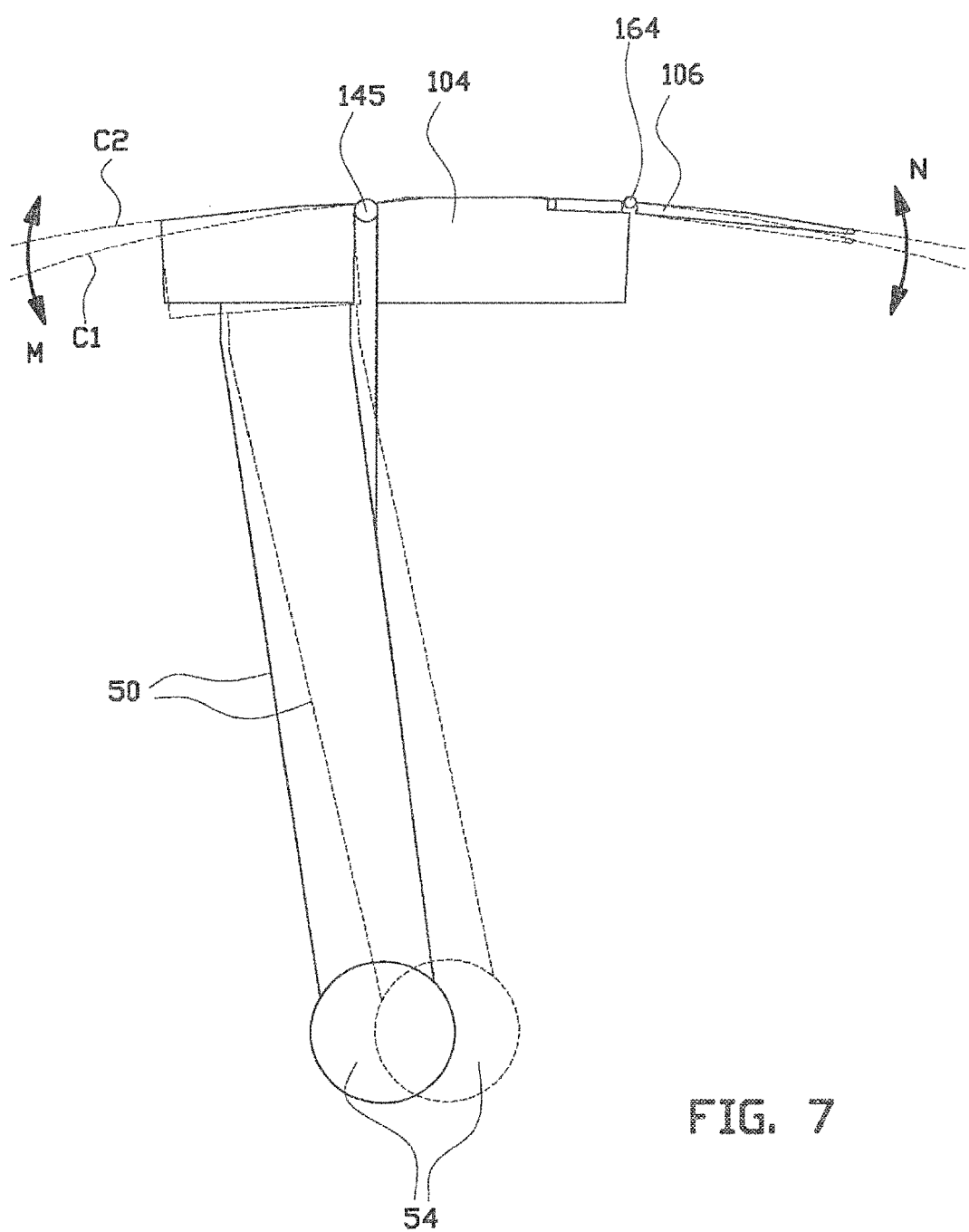
FIG. 7 shows an alternative segment for use in the tire building drum according to FIG. 1.

The segment 4 is further provided with a coupling section 45, in this exemplary embodiment in the form of a film hinge or an integral hinge, which couples the second section 42 to the first section 41. The coupling section 45 couples the second section 42 to the first section 41 so as to be bendable, articulated or flexible in the first direction of rotation M about a segment axis E, extending between the first section 41 and the second section 42, parallel to the rotational axis S of the tire building drum 1. In particular, the first section 41, the second section 42 and the coupling section 45 are integrally formed out of one piece of flexible synthetic material. In an alternative, equally functional embodiment of the segment 104, as shown in FIG. 7, the coupling section 145 is formed by an actual, separate hinge. The coupling section 45 is arranged in between the first support surface 43 and the second support surface 44 and preferably provides or forms a smooth transition between the first support surface 43 and the second support surface 44. At the side of the coupling section 45 facing towards the drum shaft 2, the first section 41 and the second section 42 are spaced apart or provided with a slit 46 to accommodate radially inward flexing, bending, articulation or rotation of the second section 42 with respect to the first section 41. In particular, the slit 46 locally weakens the segment 4 at the coupling section 45 to increase its flexibility and/or provides clearance for the second section 42 to move towards the first section 41 about the segment axis E.

As shown in FIGS. 3 and 4, the tire building drum 1 is provided with a guide assembly 5 for guiding the relative movement of the second section 42 with respect to the first section 41. The guide assembly 5 is operationally placed between or coupled to the first section 41 and the second section 42, for relatively moving the second section 42 with respect to the first section 41.

In this exemplary embodiment, the guide assembly 5 comprises a set 50 of a first push/pull rod or first arm 51 and a second push/pull rod or second arm 52. Each arm 51, 52 is provided with an elongate body 53 which, at one end, is coupled or fixed to the second section 42 and at the opposite end, is provided with a guide wheel 54. As best seen in FIGS. 1, 2, 5A and 5B, the guide assembly 5 further comprises a first radially extending, disc shaped guide plate 55 and a second radially extending, disc shaped guide plate 56 arranged at and coupled to opposite ends of the drum shaft 2 in the axial direction A of the tire building drum 1. The guide plates 55, 56 are provided with slots 57 for receiving and guiding the guide wheels 54 of the respective arms 51, 52. The slots 57 extend in a non-radial direction or under an angle with the radial direction of movement of the respective segments 4. Because of the angle, the prolongations of the slots 57 do not intersect with the rotational axis S of the drum shaft 2. The slots 57 thus impose a path of movement on the guide wheels 54 and the arms 51, 52 associated therewith, such that the second section 42 coupled to the arms 51, 52 are moved in a different direction that is offset with respect to the radial movement of the segments 4. Thus, when the segments 4 are moved in the radial direction between their contracted positions and their expanded positions, the non-radial path followed by the guide wheels 54 in the slots 57 imposes a rotational movement A on the second section 42 with respect to the first section 41 about the segment axis E. In this exemplary embodiment, the offset of the non-radial direction of the slots 57 with respect to the radial direction of the segments 4 is in a range of approximately three to twelve degrees, and preferably in the range of approximately seven to ten degrees.

Figure 8:
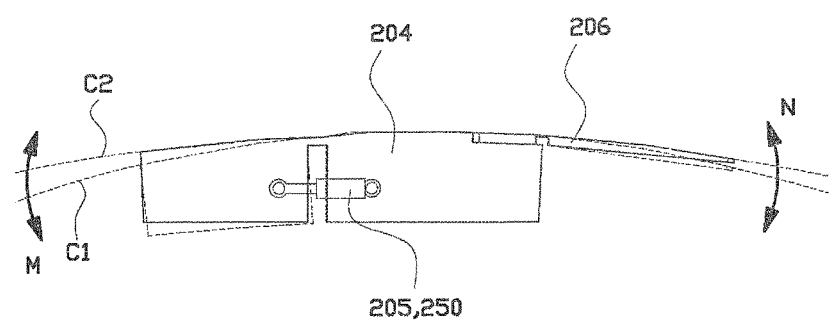
FIG. 8 shows a further alternative segment for use in the tire building drum according to FIG. 1.

Alternatively, the tire building drum 1 is provided with an actuator assembly 205 as shown in FIG. 8 that replaces the guide assembly 5. The actuator assembly 205 is provided with actuators 250 for actively actuating the required relative movements of the second sections 42 with respect to the first sections 41. The actuator 250 is preferably a linear actuator, e.g. pneumatic pistons or an electric linear drives, which is operationally placed between the first section 41 and its respective second section 42, either directly between the first section 41 and its respective second section 42 as shown in FIG. 8 or indirectly via a coupling or mechanism (not shown) at or near the drum shaft 2, for actuating the required relative movements.

Figure 6B:
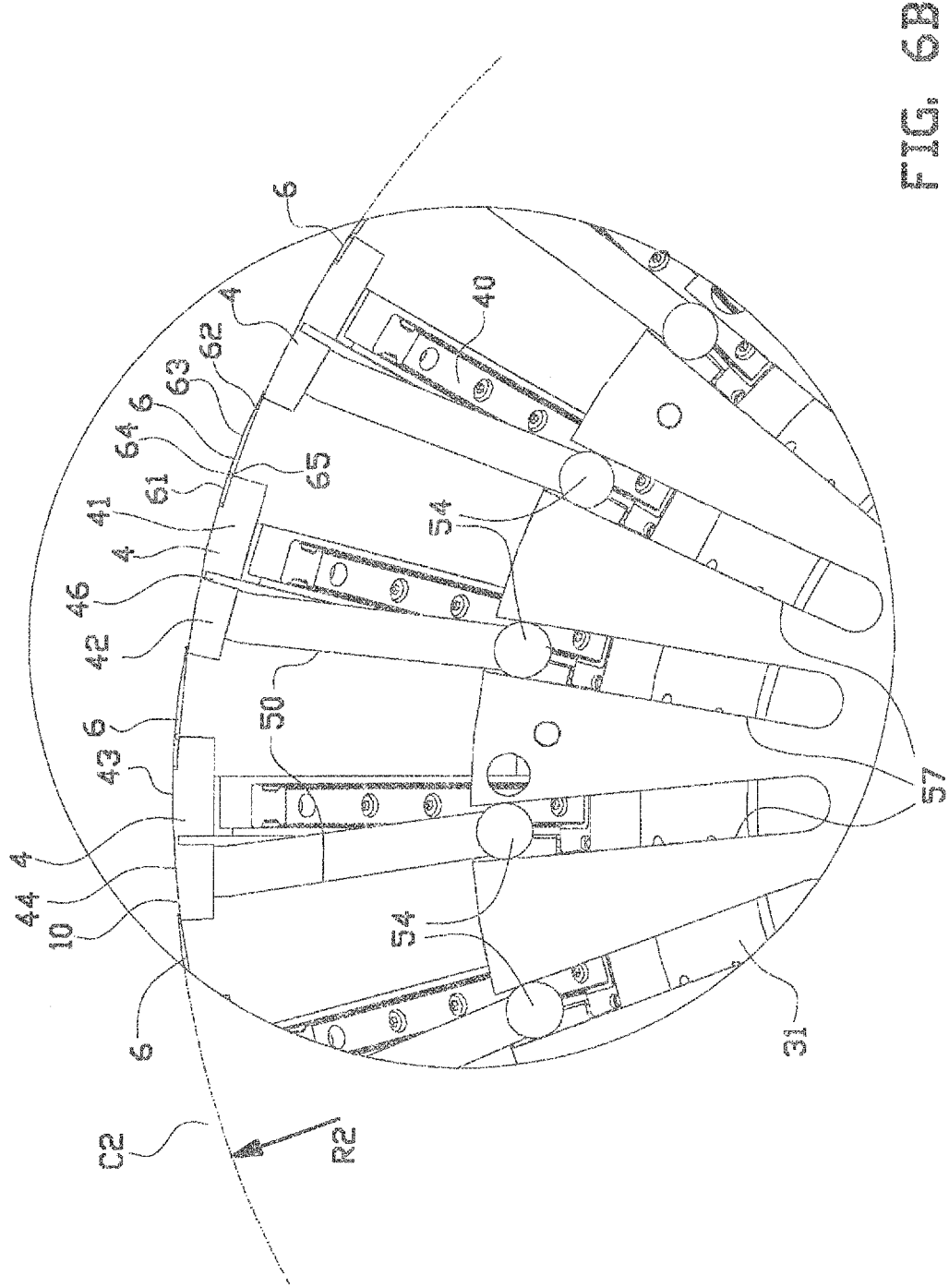
FIG. 6B shows a detail of the tire building drum according to the circle VI B in FIG. 2.

As shown in FIGS. 1 and 2, and in more detail in FIGS. 6A and 6B, the tire building drum 1 is provided with a plurality of cover elements or cover plates 6. In particular, it can be observed that, in the contracted position, the segments 4 are in close proximity to each other in the circumferential direction of the tire building drum 1. Each first section 41 of one of the segments 4 is at a short distance or in abutting contact with the second section 42 of a directly neighboring or adjacent one of the segments 4. However, when the segments 4 are moved to the expanded position as shown in FIG. 2, the segments 4 are spaced apart in the circumferential direction of the tire building drum 1. The cover plates 6 are arranged to cover, bridge or span the gaps between said spaced apart segments 4 in order to maintain a closed or substantially closed circumferential surface 10 of the tire building drum 1 during the radial movement of the segments 4.

As best seen in FIGS. 3 and 4, each of the cover plates 6 comprises a proximal end 61 that is coupled to the first section 41 of a respective one of the segments 4 and an opposite distal end or free end 62 that is arranged project from the one segment 4 to rest on or overlay the second support surface 44 of an adjacent one of the segments in the radial direction R. Each cover plate 6 further comprises a third support surface 63 extending between the proximal end 61 and the distal end 62 of the cover plate 61 for directly contacting and/or directly supporting the tire components. The third support surface 63 has been given a slight curvature and/or tapers in the direction from the proximal end 61 towards the distal end 62, while the bottom surface of the cover plate 61, facing radially inwards, is substantially flat and is arranged to rest on and/or slide over the second support surface 44 of the adjacent one of the segments 4. As shown in FIG. 4, the first section 41 of the one segment 4 is provided with a mounting surface 48 that is recessed with respect to the first support surface over a distance that is substantially equal to the thickness of the cover plate 6 at the proximal end 61. In this manner, the cover plate 6 can be mounted onto the mounting surface 48 of the first section 41 with its third support surface 63 flush with the first support surface 43. The cover plate 61 is thinnest at the distal end 62 such that, at the transition from the cover plate 61 to the second support surface 44, the cover plate 61 can be laid down as flat as possible on the second support surface 44 and/or the transition is as smooth as possible to the second support surface 44.

The cover plate 6 is arranged to be at least partly flexible, bendable or rotatable in a second direction of rotation N with respect to the first section 41 to which it is mounted, to passively follow the radial movement of the adjacent one or neighboring one of the segments 4 when the segments 4 are radially moved from the contracted position to the expanded position. In particular, it is the distal end 62 of the cover plate 6 that is movable with respect to the first section 41 to which the cover plate 6 is mounted, so as to follow the second support surface 44 on which the distal end 62 is placed, during the radial movement of the segments 4. Preferably, the cover plate 6 has a neutral or natural or relaxed curvature that has a radius that is slightly smaller than the first radius R1, such that the distal end 62 is always biased to move towards and into forced abutment onto the second support surface 44.

To allow relative movement of the distal end 62 with respect to the proximal end 61, the cover plate 6 is further provided with a coupling element 64, in this exemplary embodiment in the form of an film hinge or integral hinge, arranged between the proximal end 61 and the distal end 63, preferably at the position where the cover plate 6 protrudes freely from the first section 41 to which it is fixed. One skilled in the art will appreciate that coupling element 64 in the cover plate 6 is essentially of the same structure as the coupling section 45 in the segment 4. In an alternative, equally functional embodiment of the cover plate 104, as shown in FIG. 7, the coupling element 164 is formed by an actual, separate hinge. The coupling element 64 defines a cover plate axis F about which the distal end 62 is flexible, rotatable or bendable in a radially inward or radially outward direction. The coupling element 64 is preferably smoothly integrated in the third support surface 63. At the side of the coupling element 64 facing towards the drum shaft 2, a slit 65 is provided in the cover plate 6 to accommodate radially inward flexing, bending, articulation or rotation of the distal end 62 with respect to the proximal end 61. In particular, the slit 65 locally weakens the cover plate 6 at the coupling section 64 to increase its flexibility and/or provides clearance for the distal end 62 to move towards the proximal end 61 about the cover plate axis F.

As a result of the relative movement of the distal end 62 with respect to the proximal end 61, the curvature or radius of the third support surface 63 in between can be varied as well. The third support surface 63 is initially arranged to be at, to extend along, to match, to be concentric to or to approximate the first circumference C1 in the contracted position of the segment 4, for optimally being in direct contact and/or for directly supporting the tire components between the spaced apart segments 4. Preferably, the third support surface 63 has been given a curvature that is substantially coincident with the first circumference C1, or at least has a tangent that is substantially the same as the tangent of the circumference C1 at the third support surface 63.

The cover plates 6 are preferably manufactured from a flexible and resilient spring steel. This material allows for the cover plates 6 to firmly support the weight of the tire components, at the thickness as shown, even when the segments 4 are fully spaced apart, while still allowing for some flexibility or bending of the cover plate 6 about the cover plate axis F.

FIGS. 6A and 6B show details of the aforementioned tire building drum 1 in operation.

FIG. 6A shows the tire building drum 1 with the segments 4 in the contracted position. Each first support surface 43 extends along or is at the first circumference C1 and the first radius R1. Each second support surface 44 is arranged to be at least partially spaced apart from the first radius R1 and the first circumference C1 towards the drum shaft 2. The rest space between the second support surfaces 44 and the first circumference C1 substantially corresponds to the cross sectional shape of the cover plates 6 of the respective adjacent segments 4 such that the cover plates 6 may be received on top of the second support surfaces 44 without it intersecting or protruding with respect to the first circumference C1. In particular, it can be observed that angle of inclination of the second support surface 44 in the recessed position is substantially the same as the angle of the tapering bottom surface of the cover plate 6 supported thereon. A substantial part of said cover plates 6 is received and supported on top of the respective second support surfaces 44 in a first support position, in which third support surfaces 63 of the cover plates 6 extend along or are at the first circumference C1 and the first radius R1. The second support surfaces 44 are almost completely shielded or covered by the respective cover plates 6 supported thereon. In particular, the third support surfaces 63 are in the radially outer or external position with respect to the respective second support surfaces 44, while the second support surfaces 44 are in the radially inner or internal position. The first support surfaces 43 and the third support surfaces 63 thus form or define a first combined support surface forming a substantial part of or the entire circumferential surface 10 of the tire building drum 1 for supporting the tire components. The first combined support surface extends along, approximates or is at the first radius R1 of the first circumference C1 and preferably approximates a perfect circle.

FIG. 6B shows the tire building drum 1 with the segments 4 in the expanded position. The first support surfaces 43 are now moved into a position along or at the second circumference C2 and the second radius R2. The second sections 42 have been moved by the actuator assembly or the guide assembly 5 relative to their respective first sections 41 about the respective segment axes E, into a position in which the second support surfaces 44 extend at least partially along or at the second circumference C2 and the second radius R2. Simultaneously, each of the cover plates 6 of the respective adjacent segments 4 have been moved together with said adjacent segment 4 in the circumferential direction of the tire building drum 1 away from the respective second sections 42 on which they are supported, thereby exposing an increasing part of the respective second support surfaces 44. The second support surfaces 44 now partly define the external circumferential surface 10 of the tire building drum 1 onto which the tire components are supported. Together, the first support surfaces 43, the second support surfaces 44 and the third support surfaces 63 form or define a second combined support surface forming a substantial part of or the entire circumferential surface 10 of the tire building drum 1 for supporting the tire components. The second combined support surface extends along, approximates or is at the second radius R2 of the second circumference C2 and preferably approximates a perfect circle. Thus, in the expanded position of the segments 4, the second support surface 44 now directly supports the tire components as part of the circumferential surface 10.

Furthermore, it is noted that the raising of the second support surface 44 with respect to the distal end 62 of the cover plate 6 that is supported thereon in the radial direction R at least partly compensates for the tapering or the decrease in the thickness of the distal end 62 of the cover plate 6, and thus the gradually decreasing radius of said distal end 62 as it moves together with the adjacent segment 4 over the second support surface 44 of the one segment 4 onto which it is supported. In the second support position, the cover plate 6 thus has not solely followed the radial movement of the segment 4 onto which it is supported, but its distal end 62 has been raised or lifted slightly in the radially outward direction by the second support surface 44 onto which it is supported, towards the second circumference C2 and the second radius R2. This prevents that the third support surface 63 of the cover plate 6 generates a dip or waving pattern with respect to the first support surface 43 of the adjacent segment 4 at the position where it rests on the second support surface 44 of the adjacent segment 4. Thus, the combined second support surface as shown in FIG. 6B can be more round or circular compared to a situation where the distal end 62 of the cover plate 6 would solely follow the radial movement of the adjacent segment 4.

Figure 6C:
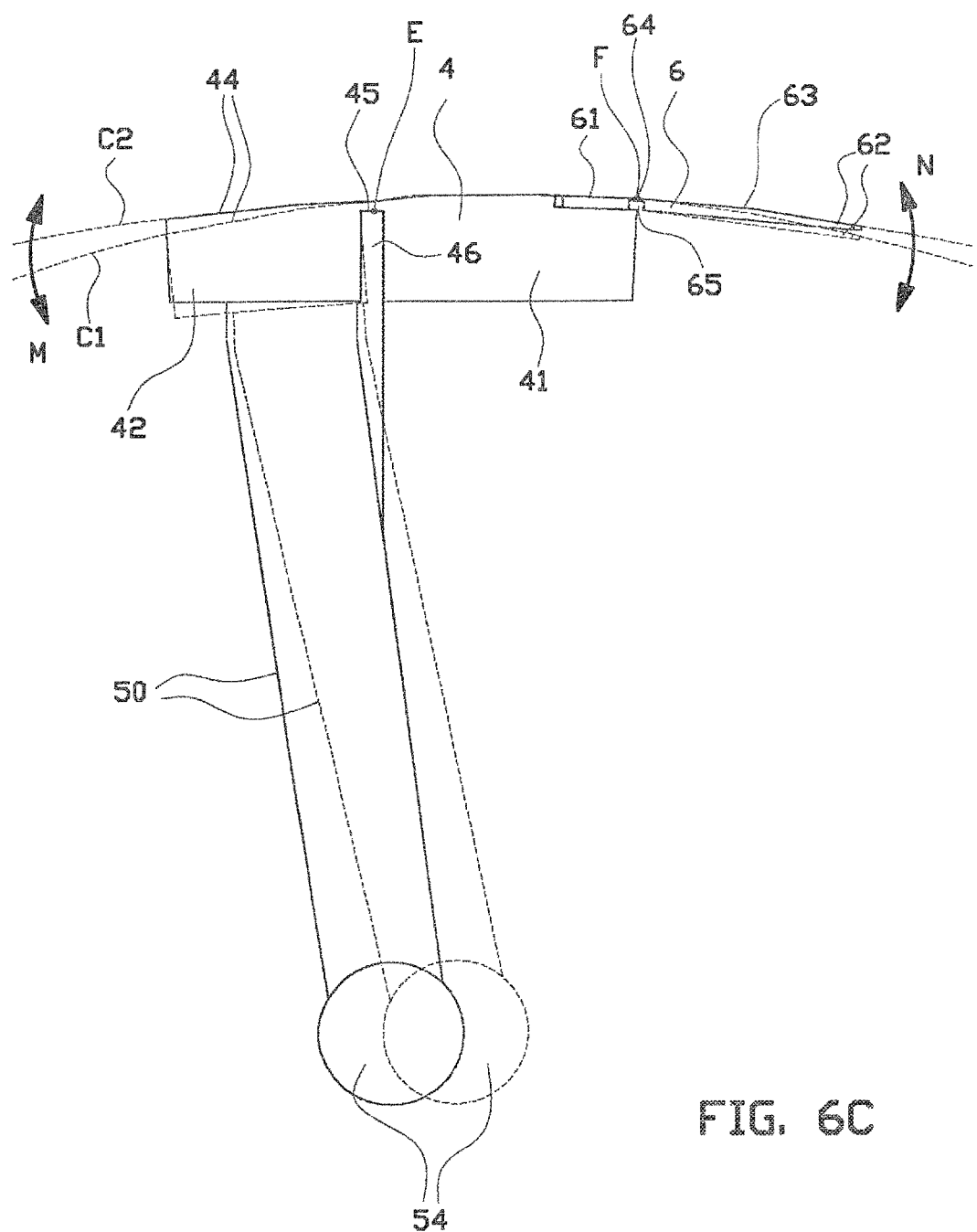
FIG. 6C shows a comparative overlay of the segments as shown in FIGS. 6A and 6B.

FIG. 6C shows a comparative overlay of one of the segments 4 in both the contracted position and the expanded position as shown in FIGS. 6A and 6B, respectively. This clearly illustrates the differences in orientation of the second section 42 with respect to the first section 41 of the segment 4 and of the distal end 62 with respect to the proximal end 61 of the associated cover plate 6.

In this exemplary embodiment, the natural or relaxed condition of the segment 4 is the condition in which the second section 42 is in the extended position with respect to the first section 41. The second section 42 is thus pulled inwards by the arms 51, 52 towards the drum shaft 2, into a flexed condition. It has been found that this reduces the chances of fatigue of the material of the segment 4, in particular at or near the coupling section 45 thereof. In particular, cracks in the externally facing first support surface 43 and/or second support surface 44 can be prevented, which could potentially cause irregularities in the consistency of the tire components supported thereon.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

In summary the invention relates to a tire building drum comprising a drum shaft and a circumferential surface for receiving a tire component, wherein the circumferential surface is defined by segments which are radially movable between a contracted position in which the circumferential surface has a first radius and an expanded position in which the circumferential surface has a second, greater radius, wherein the tire building drum comprises cover plates, wherein each segment is provided with a first section having a first support surface for supporting the tire component and a second section with a second support surface for supporting the cover plate, wherein each second section is movable relative to its respective first section from a recessed position in which the second support surface is recessed with respect to first radius and an extended position in which the second support surface is raised towards the second radius.

The invention claimed is:

1. A tire building drum comprising a drum shaft and a circumferential surface concentric to the drum shaft for receiving a tire component, wherein the circumferential surface is defined by segments which are movable in a radial direction with respect to the drum shaft between a contracted position in which the circumferential surface has a first radius and an expanded position in which the segments are spaced apart and in which the circumferential surface has a second, greater radius, wherein the tire building drum comprises cover plates spanning the spaced apart segments, wherein each segment is provided with a first section having a first support surface for supporting the tire component in the radial direction and a second section with a second support surface supporting the cover plate of an adjacent one of the segments in the radial direction, wherein, with the movement of the segments from the contracted position to the expanded position, each second section is movable relative to the first section of the same segment from a recessed position to an extended position, respectively, wherein, in the recessed position, the second support surface is recessed with respect to first radius towards the drum shaft and wherein, in the extended position, the second support surface is raised from the recessed position towards the second radius, wherein each segment is provided with a coupling section that, considered in a circumferential direction about the drum shaft, is located at the circumferential surface of the drum between the first section and the second section, wherein the coupling section defines a segment axis extending parallel to the drum shaft, wherein the second section is arranged to be rotated or bent relative to the first section between the recessed position and the extended position about the segment axis, and wherein the coupling section is arranged in between the first support surface and the second support surface.

2. The tire building drum according to claim 1, wherein the coupling section comprises a hinge, a film hinge or an integral hinge.

3. The tire building drum according to claim 1, wherein the first section, the second section and the coupling section are integrally formed.

4. The tire building drum according to claim 3, wherein the first section, the second section and the coupling section are formed of a flexible synthetic material.

5. The tire building drum according to claim 1, wherein each segment is provided with a slit cooperating with the coupling section to facilitate the bending or rotation of the second section relative to the first section.

6. The tire building drum according claim 1, further comprising a guide assembly or actuator assembly that is operationally coupled to each of the second sections for guiding or actuating the relative movement of the second sections with respect to their respective first sections.

7. The tire building drum according to claim 6, wherein the guide assembly or actuator assembly is operationally placed between each second section and its respective first section.

8. The tire building drum according to claim 6, wherein the tire building drum comprises a drive system coupled to each of the first sections for driving the radial movement of the segments between the contracted position and the expanded position relative to the drum shaft, wherein the guide assembly comprises a plurality of arms, each of which is coupled to a respective one of the second sections and a guide plate for guiding the plurality of arms relative to the drum shaft, wherein the guide plate is provided with a plurality of slots extending under an offset with the radial direction, wherein the each of the arms is slidably received in a respective one of the slots for movement along a non-radial path, wherein the difference between the radial movement imposed by the drive system on the first segments and the non-radial movement imposed by the guide plate on the plurality of arms causes the movement of the second sections relative to their respective first sections.

9. The tire building drum according to claim 1, wherein each cover plate comprises a proximal end that is coupled to the first section of a respective one of the segments, an opposite distal end that rests on the second support surface of an adjacent one of the segments and a third support surface extending between the proximal end and the distal end for supporting the tire component between the spaced apart segments, wherein the distal end of said cover plate is movable relative to its respective first section to follow the movement of the second support surface of the adjacent one of the segments when the second section of said adjacent one of the segments is moved from the recessed position to the extended position.

10. The tire building drum according to claim 9, wherein said cover plate comprises a coupling element between the proximal end and the distal end, wherein the coupling element defines a cover plate axis extending parallel to the drum shaft, wherein the distal end is arranged to be rotated or bent relative to the proximal end about the cover plate axis.

11. The tire building drum according to claim 10, wherein the coupling element comprises a hinge, a film hinge or an integral hinge.

12. The tire building drum according to claim 10, wherein the proximal end, the distal end and the coupling element are integrally formed.

13. The tire building drum according to claim 12, wherein the proximal end, the distal end and the coupling element are formed out of spring steel.

14. The tire building drum according to claim 10, wherein each cover plate is provided with a slit cooperating with the coupling element to facilitate the bending or rotation of the distal end relative to the proximal end.

15. The tire building drum according to claim 9, wherein, in the recessed position, the second support surface supports the cover plate in a first support position with its third support surface extending substantially along or at the first radius and wherein, in the extended position, the second support surface supports the cover plate in a second support position with its third support surface extending substantially along or at the second radius.

16. The tire building drum according to claim 15, wherein, with the movement of the second section from the recessed position to the extended position, the second section lifts the distal end of the cover plate supported thereon towards the second circumference.

17. The tire building drum according to claim 9, wherein the first support surfaces and the third support surfaces form a combined support surface with an average radius which in the contracted position of the segments is equal to or substantially equal to the first radius and in the expanded position of the segments is equal to or substantially equal to the second radius.

18. The tire building drum according to claim 1, wherein the cover plates, in the contracted position of the segments, at least partially cover the second support surface on which they are supported, wherein an increasing part of said second support surface is exposed when the segments are moved towards the expanded position, wherein each second section, in the extended position, is moved towards the second radius such that the exposed part of the second support surface extends substantially along or at the second radius.

19. The tire building drum according to claim 18, wherein the exposed part of the second support surface is arranged for directly supporting the tire component.

20. The tire building drum according to claim 18, wherein each cover plate comprises a proximal end that is coupled to the first section of a respective one of the segments, an opposite distal end that rests on the second support surface of an adjacent one of the segments and a third support surface extending between the proximal end and the distal end for supporting the tire component between the spaced apart segments, wherein the distal end of said cover plate is movable relative to its respective first section to follow the movement of the second support surface of the adjacent one of the segments when the second section of said adjacent one of the segments is moved from the recessed position to the extended position, wherein the first support surfaces, the second support surfaces and the third support surfaces, in the expanded position of the segments form a combined support surface with an average radius which is equal to or substantially equal to the second radius.

21. A method for varying the radius of the circumferential surface of a tire building drum as claimed in claim 1, wherein the method comprises the step of moving each second section relative to its respective first section, simultaneously with the movement of the segments from a contracted position to an expanded position, from a recessed position to an extended position.

22. The tire building drum according to claim 1, wherein the coupling section forms a smooth transition between the first support surface and the second support surface.

* * * * *